Oct. 9, 1956     I. BENTOV     2,766,160
METHOD OF MAKING LAMINATED PLASTIC TUBING
Filed Dec. 13, 1952     2 Sheets-Sheet 1
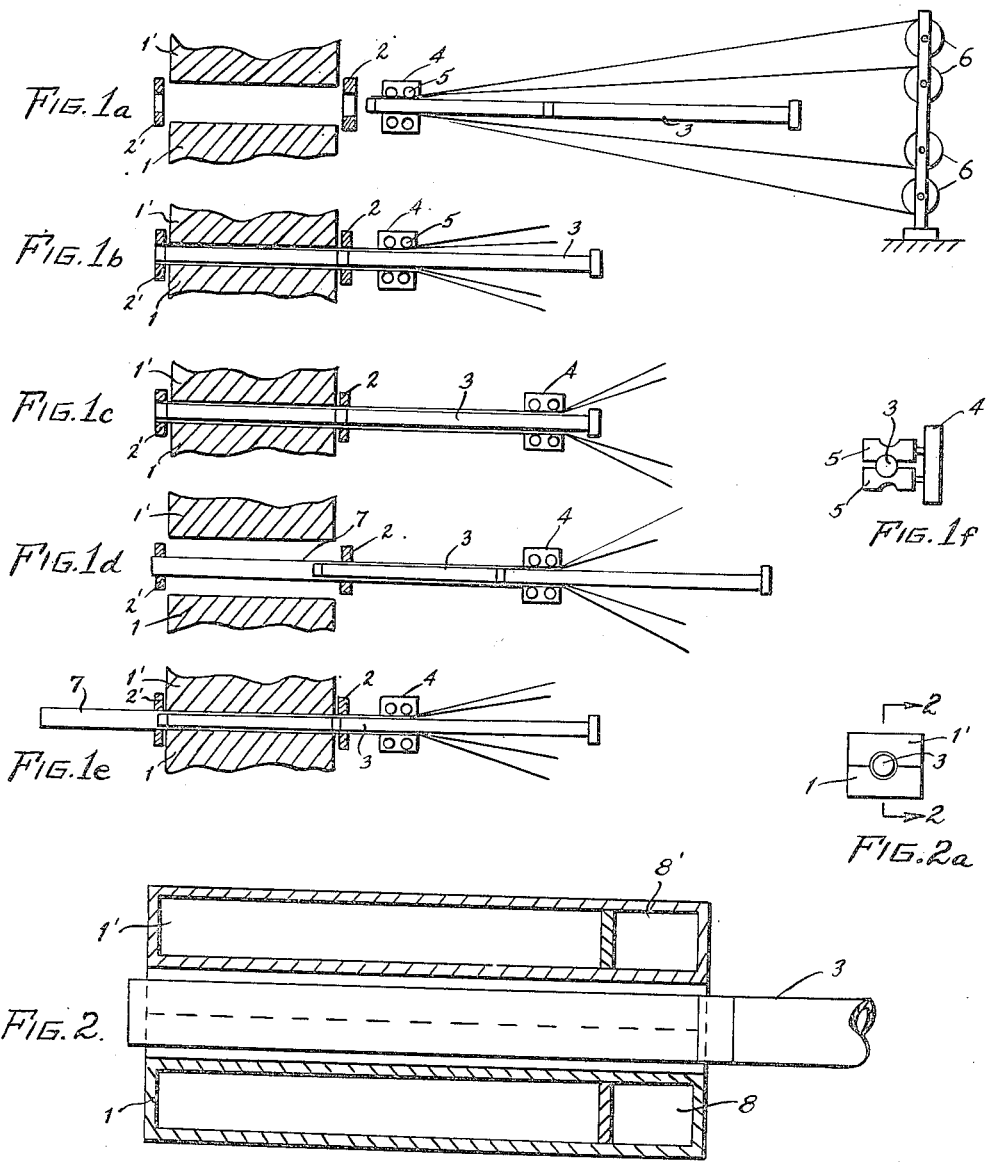
ITZHAK BENTOV,
INVENTOR
BY
ATTORNEY

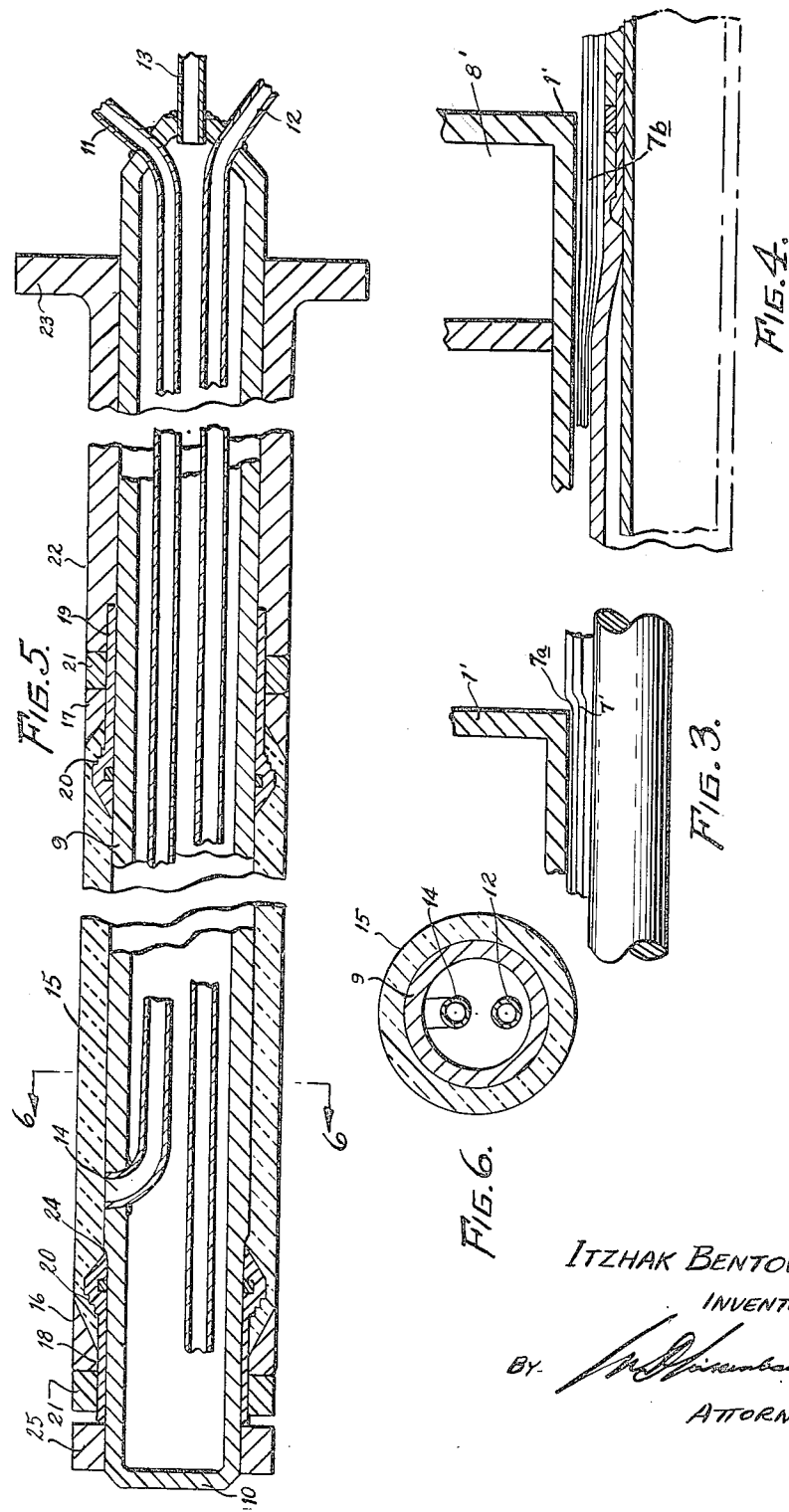

United States Patent Office 2,766,160
Patented Oct. 9, 1956

2,766,160

METHOD OF MAKING LAMINATED PLASTIC TUBING

Itzhak Bentov, Haifa, Israel

Application December 13, 1952, Serial No. 325,756

Claims priority, application Israel December 16, 1951

3 Claims. (Cl. 154—83)

This invention relates to and has as its object to provide a novel method of manufacturing tubes from laminated thermosetting plastics, and devices for carrying out the new process.

Laminated-plastic tubes are usually made whereby a band of paper or fabric, soaked and coated with thermosetting resin, as a rule phenolic resin in the condensed and partially polymerized stage (the so-called "B" stage) is disposed in one or several layers on a mandrel and hardened under heat and pressure in a mould in which the mandrel is temporarily inserted. The usual process cannot produce tubes longer than the mould, and as the length of the latter is limited by considerations of capital investment, convenience of handling and factory space, laminated plastic tubes are so far made in relative short lengths only.

The impossibility of making tubes longer than the mould by hitherto known processes and with hitherto known apparatus is mainly due thereto that if the mould is applied to a part of the non-hardened tube, the moulded length is compressed to a smaller diameter than the length of the tube not yet moulded, and in the transition between the moulded and unmoulded parts of the tube, hardening of the material takes place outside the mould adjacent the latter owing to the heat emanating from the mould so that a hard knot of larger diameter than the moulded part forms immediately adjacent the latter and cannot afterwards, when the hitherto unmoulded length of the tube is pushed forwards into the mould for continuing the moulding process along the tube, be reduced to the smaller diameter which the tube shall be given during the moulding process.

It is the object of this invention to overcome this drawback and to enable the manufacture of laminated-plastic tubes longer than the mould by successive moulding operation along the length of the tube.

The invention consists in a process of manufacturing laminated-plastic tubes wherein a tube is formed on a mandrel from bands of paper or fabric soaked and/or coated with pre-condensed hardenable thermosetting resin and the tube is hardened by successive moulding operations under heat and pressure, performed along the length of the tube by means of a mould shorter than the length of the tube to be made, and during each moulding operation the rear end portion of the mould, facing the not yet moulded part of the tube, is cooled to such a degree that the not yet moulded part of the tube immediately adjacent the mould is not affected by the moulding operation.

The invention also consists in a mould for carrying out the process aforesaid, being a mould of generally conventional design, but including a cooling chamber at one end.

The mandrel used in performing the process according to this invention may either have a relatively short length in which case it will be retracted after each moulding operation so as to clear a length of moulded tube, and then be pushed forwards again with a fresh length of unmoulded tube continuing the already moulded part thereof. Or else, the mandrel may be so long that the tubes to be made can be fed to and through the mould by simply pushing the mandrel with the tube thereon onwards after each moulding operation.

The invention also provides a particularly useful mandrel for carrying out the process aforesaid which, for greater ease of detachment from the tube or the length of tube moulded thereon without damaging it, is so arranged that over part of its length its diameter can be reduced after the moulding operation.

The invention is explained and illustrated, by way of example only, by the accompanying drawings in which:

Figs. 1a to e show diagrammatically a part of a full working cycle in manufacturing a tube by the process according to the invention;

Fig. 1f is a side view of part of Fig. 1a;

Fig. 2 is an axial section of a mould according to the invention;

Fig. 2a is a side view of Fig. 2;

Fig. 3 is a fragmentary diagrammatic sectional view of the rear end of part of a mould of conventional design with a length of tube, showing the transition between the moulded and unmoulded parts of the tube;

Fig. 4 shows similarly the moulding operation with a mould and mandrel according to the invention;

Fig. 5 is an axial section of a mandrel according to the invention;

Fig. 6 is a cross-section thereof on line 6—6 of Fig. 5.

Turning first to Figs. 1a to e the mould comprises a fixed or movable bottom part 1 and movable upper part 1', and stationary guide rings 2, 2' disposed in front of its ends. For co-operation with the mould a mandrel 3 is provided on which a casing 4 is slidably arranged, which encloses a plurality of rollers 5 or one or more rings, and means for heating these, which may be electric resistors, not shown. A number of reels 6 carrying a store of paper or fabric band soaked and/or coated with phenolic resin in the "B" stage are stationarily mounted in front of the end of the mandrel opposite the mould and allow the bands to be drawn over the mandrel towards the mould with a certain overlap along generatrices of the mandrel.

At the start of the operation the casing 4 is moved along the mandrel 3 to the front end of the mandrel near the mould, the bands are drawn over the mandrel (Fig. 1a), whereafter the casing is shifted back along the mandrel until about the middle thereof. By the heated rollers 5 the bands are fused together and made to form a tube having a length equal to about the length of the mould or slightly greater. Then the mandrel is inserted in the mould, the mould is closed (Fig. 1b), and the moulding operation is performed. While the moulding is going on the formation of the tube on the mandrel outside the mould is continued by moving the casing 4 to the end of the mandrel (Fig. 1c). When the first moulding step is completed the mould is opened and the mandrel withdrawn from the greater part of the moulded length of tube 7 (Fig. 1d), then the mandrel is pushed farther into the mould so as to bring a length of unmoulded tube into the mould and to remove therefrom the length 7. Again the mould is closed (Fig. 1e) and the second moulding step is performed.

Fig. 3 shows the position at the rear end of a mould of conventional design. It shows the rear edge portion of the mould top 1' and a length of tube 7' of which a portion is within the mould and another portion outside.

This figure shows, somewhat exaggeratedly, the reduction of the diameter of the tube within the mould owing to the moulding pressure, and the concomitant formation of a zone of transition 7a between the moulded and unmoulded parts. If the process is thus carried out in a usual mould heated over its whole length, the zone 7a and even some part of the unmoulded length of tube adjacent to the zone 7a, are warmed by the heat radiated from the mould and carried by conduction along the tube itself, to such an extent as to undergo polymerisation and hardening. When after this moulding step the mandrel is pushed onwards so that the zone 7a is now situated within the mould near the front end thereof, this zone of the tube will have become so hard that it can no longer be compressed to the diameter of the part of the tube already moulded, and forms a knot which prevents proper closing-in of the mould on the hitherto unmoulded part of the tube, and constitutes a break of continuity of the tube, impairing its mechanical strength and spoiling its appearance.

However, if the rear end portion of the mould is kept cool, the zone 7a, and a fortiori the adjacent unmoulded part of the tube, remains below hardening temperature and are not affected by the moulding operation. This is shown in Fig. 4. In that case a part 7b of the tube within the mould in contact with the cooled chamber 8' thereof is likely not to be completely hardened, but there is no harm in this as on pushing the moulded part of the tube onwards for bringing a new portion of unmoulded tube into the mould, this incompletely hardened zone of the moulded length of tube will be retained in the front end zone of the mould for completion of the moulding. The difference in the thickness of the completely fused portion of the tube in the hot part of the mould and the less fused part 7b of the tube is compensated for by various degrees of expansion of the inflatable mandrel (see below).

Fig. 2 illustrates a mould for carrying out the process according to this invention. It comprises a fixed or movable hollow bottom part 1, and a movable hollow top part 1', both with substantially semi-circular moulding recess so that the two parts together completely surround the mandrel with the resin impregnated paper or cloth bands. The hollow space of both parts is subdivided. Its larger front part serves for receiving a heating medium or heating means, while the smaller rear chambers 8, 8' are devised as cooling chambers. The cooling may be effected by means of water, and water inlet and outlet connections (not shown) will be provided.

The mandrel illustrated in Figs. 5 and 6 comprises a tubular main part 9 of steel or the like, closed at its front end 10 and provided with entrance ports at its opposite end for a compressed-air duct 11 and a cooling-water feed conduit 12, both of which extend nearly through the whole mandrel, and a cooling-water drain 13. The conduit 11 opens into a port 14 provided in the wall of the mandrel. The front part of the mandrel is coated with a sleeve 15 of rubber or other elastic material covering inter alia the port 14. The sleeve tapers at both ends, which are inserted in correspondingly shaped recesses or rings 16, 17 movable along externally threaded sleeves 18, 19, respectively, which in their turn are slidable on the mandrel. The inner ends of the sleeves 18, 19 are thickened, and stopped shoulders 20 are formed thereon. Ruts 21 are screwed on the sleeves 18 and 19 and tightened against the rings 16, 17, whereby the tapering ends of the rubber sleeve are firmly gripped. Furthermore, a metal sleeve 22 with flange 23 is screwed on the outer end of sleeve 19. The length of the sleeve 22 is substantially equal to, or even greater than, that of the rubber sleeve. When not in operation the outer diameter of the rubber sleeve 15 is slightly smaller than the intended inner diameter of the tube to be made. In order to prevent the tube from adhering to the mandrel, the first layer applied to the mandrel consists of a strip of already finally polymerized ("C"-stage) resin which protects the mandrel against direct contact with the liquid "B"-stage resin. This precaution may be unnecessary where the elastic material of the mandrel sleeve has no affinity to the resin. The mandrel with the pre-formed tube thereon is inserted in the mould, and the rubber sleeve is inflated by introducing air through conduit 11.

After the moulding operation the mandrel is first deflated, but as a rule the rubber sleeve will not yet detach itself from the tube. For detaching the mandrel and withdrawing the flange 23 is seized and sleeve 22 is pulled backwards whereby the rubber sleeve 15 is stretched and its diameter is reduced. The stretching is made possible because sleeve 18 is anchored at its inner end and bears against a shoulder 24 formed in the surface of the mandrel, while on the front end of the mandrel said sleeve 18 is held by a nut 25. Cooling of the mandrel is effected over its whole length by introducing water through conduit 12 and allowing it to flow out through the drain 13.

While a length of tube formed on the rubber sleeve 15 is being moulded, another length is pre-formed on the sleeve 22, and by the subsequent withdrawal of the mandrel the rubber sleeve is shifted back into the newly pre-formed length whereafter a second moulding step can be carried out.

Instead of applying the resin paper or fabric strips lengthwise to the mandrel, as described above, they may be wound spirally thereon.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. A method of producing plastic tubing of optional length comprising the steps of: forming as a tube, laminations of thermosetting resin impregnated material; and molding the tube in sections by cooling one end of a section sufficiently to prevent the resin from flowing and setting, while subjecting the section to a substantially uniform pressure from within and without to compact the laminations and fuse them together, and heating the remainder of the section to flow the resin, whereby the thickness of the wall of the section undergoes a gradual change at the one end, reflecting a gradual transition in the state of the resin.

2. A method of producing plastic tubing of any desired length comprising the repetitive steps of: forming as a tube of predetermined length less than the desired length, laminations of thermosetting resin impregnated material; advancing the major portion of the tube thus formed into a mold; and in the mold cooling the trailing end of the tube sufficiently to prevent the resin from flowing and setting, while subjecting the tube to a substantially uniform pressure from within and without to compact the laminations and fuse them together, and heating the remainder of the tube to flow the resin and set it, whereby the thickness of the wall of the tube so molded undergoes a gradual change at the one end, reflecting a gradual transition in the state of the resin.

3. The method of producing laminated plastic tubing of optional length comprising forming as a tube a plurality of continuous strips of thermosetting resin-impregnated sheet material, each of less width than the interior circumference of the tube to be produced, by feeding the strips lengthwise into edgewise overlapping tubular wall forming relation onto an elastic radially expansive member, successively interrupting the feed of the material and during each such interruption subjecting the tube to a substantially uniform internal pressure along its length, while restraining the tube exteriorly against radial expansion; and applying heat together with such pressure to a relatively advanced section of the tubular wall to flow the resin and to compact the wall of the tube, while cooling a relatively less advanced section of the wall immediately adjacent the section being heated to cause a gradual transition in the state of the resin and the compactness of the wall between the heated and the cooled sections; and thereafter withdrawing said member from the tube and resuming forming as a tube thereon said sheet material to be advanced into the position previously occupied by said heated and cooled sections for repetition of the operation.

References Cited in the file of this patent

UNITED STATES PATENTS

| | | |
|---|---|---|
| 1,375,623 | Bartels | Apr. 19, 1921 |
| 1,708,129 | Gammeter | Apr. 9, 1929 |
| 1,921,516 | Frederick | Aug. 8, 1933 |
| 2,320,564 | Brooks | June 1, 1943 |
| 2,387,631 | Weir | Oct. 23, 1945 |
| 2,422,188 | Epstein | June 17, 1947 |
| 2,509,715 | Allen et al. | May 30, 1950 |
| 2,614,058 | Francis | Oct. 14, 1952 |
| 2,637,674 | Stahl | May 5, 1953 |
| 2,678,677 | Hervey et al. | May 18, 1954 |
| 2,683,899 | Reichenbach | July 20, 1954 |
| 2,688,159 | Swartz et al. | Sept. 7, 1954 |